United States Patent [19]

Critchley et al.

[11] 3,814,865

[45] June 4, 1974

[54] TELEPHONE SUBSTATION APPARATUS FOR GENERATING MULTIFREQUENCY SIGNALS

[75] Inventors: John Edward Critchley; William John Haight, both of London, Ontario, Canada

[73] Assignee: Bell Canada-Northern Electric Research Limited, Ottawa, Ontario, Canada

[22] Filed: Jan. 8, 1973

[21] Appl. No.: 321,663

[52] U.S. Cl. .................... 179/84 VF
[51] Int. Cl. .................... H04m 1/50
[58] Field of Search .................... 179/84 VF, 90 K

[56] References Cited

UNITED STATES PATENTS 3,784,759 1/1974 Haight .................... 179/84 VF

*Primary Examiner*—Kathleen H. Claffy
*Assistant Examiner*—Alan Faber
*Attorney, Agent, or Firm*—John E. Mowle

[57] ABSTRACT

A multifrequency signalling arrangement for a subscriber telephone set or other telephone substation circuit. In this arrangement a resonant circuit, comprising a pair of tapped inductors and associated capacitors, is connected in parallel with an amplifier, which forms part of a multifrequency oscillator, through a set of late-break contacts mechanically linked to each digit button on the selector pad. During the initial period of travel of a selected digit button a set of early-make contacts, also linked to the digit buttons, simultaneously enable the amplifier and energize the resonant circuit. At a later period of travel of the selected digit button the late-break contacts separate to interrupt the flow of direct current through the resonant circuit and thereby initiate oscillations in said resonant circuit at the selected frequency which are supported by the yet enabled amplifier and transmitted to the telephone central office.

9 Claims, 1 Drawing Figure

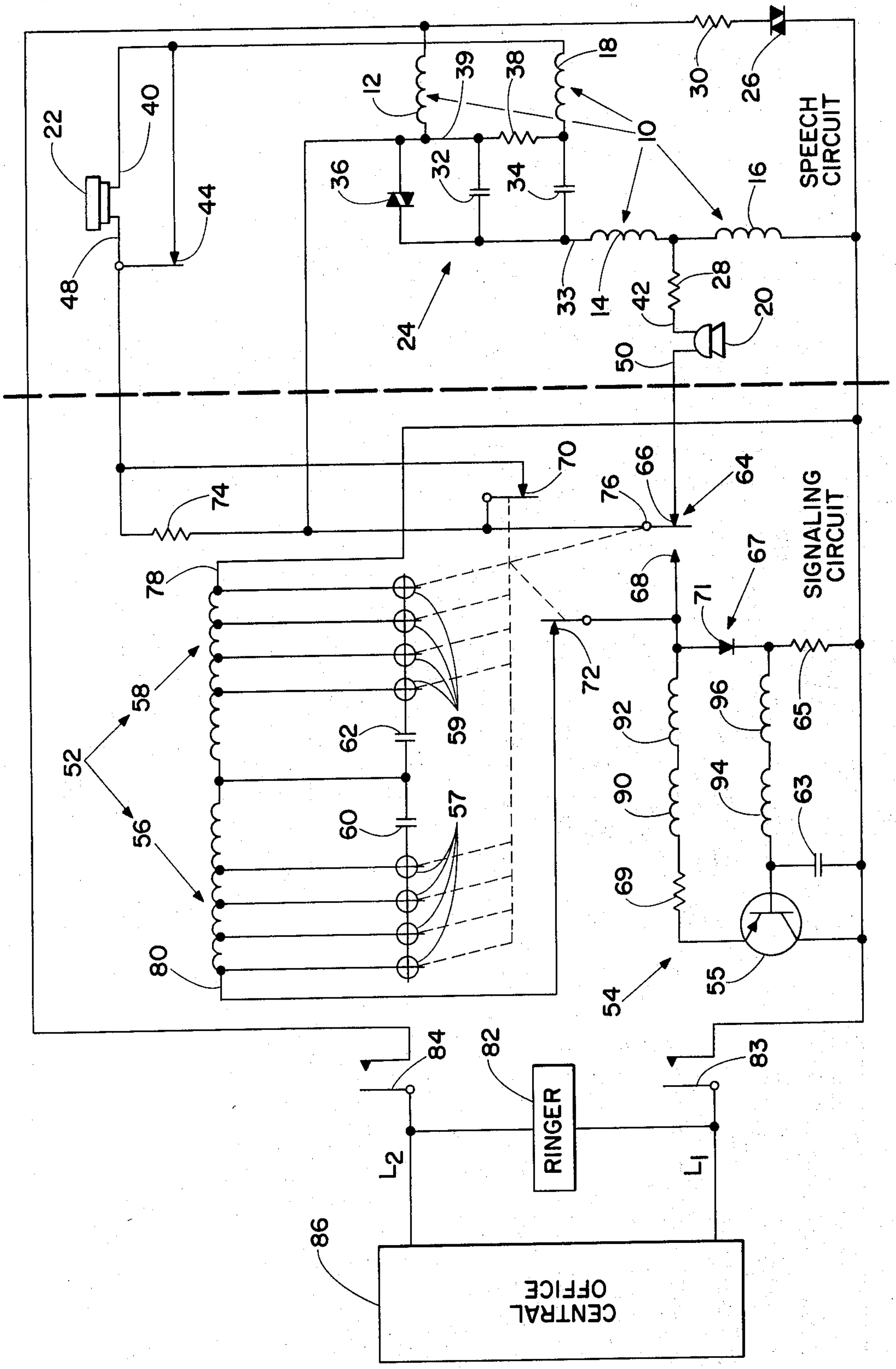
SPEECH CIRCUIT
SIGNALING CIRCUIT
RINGER
CENTRAL OFFICE

TELEPHONE SUBSTATION APPARATUS FOR GENERATING MULTIFREQUENCY SIGNALS

FIELD OF THE INVENTION

This invention relates to telephone substation apparatus and more particularly to a multifrequency signalling arrangement for a subscriber telephone set or telephone substation circuit.

DESCRIPTION OF THE PRIOR ART

Many circuits are now available for generating the required combinations of audiofrequency tones which are now popularly used to signal a telephone central office in lieu of the traditional rotary dial.

Typical circuit arrangements are described in U.S. Pat. No. 3,184,554 issued to Larned A. Meacham on Sept. 8, 1958 and in U.S. Pat. No. Re25,507 reissued to Larned A. Meacham on Jan. 7, 1964 and also in U.S. Pat. No. 3,284,577 granted to R. V. Burns and R. T. Cleary on Nov. 8, 1966. The relative advantages and disadvantages of the prior art circuits may be studied in detail by referring to the aforementioned patents.

Certain disadvantages of the prior art circuits still remain with respect to the effect of the signalling circuitry on the speech transmission capabilities of the telephone set and with respect to the design of the mechanical switches which enable the amplifier and interrupt the flow of direct current in the resonant circuit. In particular, with regard to speech transmission capabilities, it can be readily seen in aforementioned U.S. Pat. No. 3,184,554 that the particular varistor which is in series with the telephone line remains in series with the telephone line after the signalling function has been completed. This varistor decreases the sensitivity of the telephone substation apparatus or subscriber telephone set so as to limit the maximum distance from the central office over which the telephone set can be located. Additionally, this varistor tends to degrade voice transmission.

The teachings of U.S. Pat. No. Re25,507 overcome some of the limitations of the circuitry of earlier U.S. Pat. No. 3,184,554 however, the resonant circuit remains in the speech circuit after signalling is completed and the design of the transfer switch remains somewhat critical. In particular changes in transition time between interruption of the current flow in the resonant or tank circuit and the application of bias to the transistor amplifier may lead to erratic oscillator operation. The design problems associated with the pushbutton dial or selector switches and their associated transfer switch which initiates oscillations in the resonant circuit are well described in U.S. Pat. No. 3,284,577 to R. V. Burns, et al. To partially overcome the problems associated with the design of the selector switch and associated transfer switch, U.S. Pat. No. 3,284,577 to R. V. Burns, et al., described an oscillator arrangement wherein the resonant circuit is excited at the instant that the amplifier is enabled. In the oscillator arrangement described in U.S. Pat. No. 3,284,577, unlike the other aforementioned arrangements, the capacitors associated with the resonant circuit begin to charge after the desired digit has been selected by depressing the associated digit button of the pushbutton dial. When the transfer switch has reached its make position the charged capacitors are connected across the selected portions of the coils which comprise the resonant circuit and the amplifier is simultaneously enabled.

Although the circuit described in aforementioned U.S. Pat. No. 3,284,577 overcomes certain disadvantages of the prior art, a disadvantage arising from the charging time constant for the resonant circuit capacitors remains. Referring now to the drawing of U.S. Pat. No. 3,284,577, this time constant is affected by diode 40 and resistor 38 which are connected in series with the resonant circuit across the telephone line so that the total resistance thereof may prevent the resonant circuit capacitors from acquiring sufficient charge during the interdigit intervals. If resistors 58 and 59 are used to bridge the selector contacts so that the resonant circuit capacitors can charge between digits and thereby increase the charge in the resonant circuit capacitors, a series circuit comprising the resonant circuit and the amplifier remains across the telephone line during voice transmission to affect the speech transmission characteristics of the subscriber telephone set. One circuit which overcomes some of the limitations of the prior art is described in copending Canadian application Ser. No. 139,792 filed on Apr. 17, 1972 on an invention by W. J. Haight, et al. The present application relates to another circuit which also overcomes some of the disadvantages of the prior art.

SUMMARY OF THE INVENTION

It has been found that the problems associated with many of the prior art forms of multifrequency signalling arrangements may be overcome by connecting the resonant circuit in parallel with the amplifier through a set of later-break contacts linked to the selector switch or pushbutton dial. When a selected pushbutton or digit button is actuated, a transfer switch having an early-make, late-break set of contacts connects the amplifier and resonant circuit (which are connected in parallel through the later-break contacts at this time) through its early-make contacts to the speech circuit to derive an operating voltage therefrom. After the amplifier and resonant circuit are enabled or energized, the late-break set of contacts of the transfer switch separate to disconnect the voice transmitter unit from the speech circuit. After another interval of time, dependent on the design of the transfer switch, the later-break set of contacts, which connect the resonant circuit in parallel with the amplifier, separate to interrupt the flow of direct current through the resonant circuit and thereby begin oscillations in said resonant circuit which are supported by the amplifier which remains energized through the early-make contacts of the transfer switch. Note the early-make contacts of the selector switch make before the late-break contacts of said switch separate. The later-break contacts which are mechamically linked to, but not part of, the transfer switch, separate after the late-break contacts have separated. It can be seen that the energization of the resonant circuit, begins at the same time that the amplifier is enabled, and is interrupted after a definite interval dependent on the time interval between closure of the early-make contacts of the transfer switch and the separation of the later-break contacts. In this manner dampened wave oscillations, beginning in the resonant circuit, are supported by the amplifier before they have had time to decay in order to provide consistent signalling operation which is not overly critical of the design of the selector switch transfer switch and other associated switch contacts. Furthermore, once the signalling function has been completed the signalling circuitry is disconnected such that the input impedance, as seen from the telephone line, of a subscriber's telephone set constructed in accordance with the present invention compares closely to the corresponding input impedance of a standard telephone set equipped with a rotary dial.

Thus in accordance with the present invention the telephone signalling arrangement comprises a resonant circuit with a plurality of selectively controllable resonant frequencies. A selector means is provided for selecting a particular resonant frequency and an amplifying means is coupled to the resonant circuit to support oscillations at the selected resonant frequency. A first switch means, responsive to the selector means, maintains the resonant circuit in parallel with the amplifying means until after a second switch means also responsive to the selector means, has simultaneously allowed a direct current to flow through the amplifying means and the resonant circuit.

When the first switch means disconnects the resonant circuit from the amplifying means to interrupt the flow of direct current through the resonant circuit, oscillations begin at the selected frequency in the resonant circuit which are supported by the yet enabled amplifying means.

BRIEF DESCRIPTION OF THE DRAWING

An example embodiment of the invention will now be described with reference to the accompanying circuit drawing of a telephone subscriber set in accordance with the present invention.

DESCRIPTION OF A PREFERRED EMBODIMENT

In the example embodiment, the circuitry comprises two distinct portions which are separated by a dashed vertical line. The portion to the right of this dashed line is the speech circuit and the portion to the left of this line is the signalling circuit. The speech circuit which is conventional in form includes: inductor 10 with first 12, second 14, third 16 and fourth 18 inductor windings, a voice transmitter unit 20, a voice receiver unit 22, a balancing network 24, a first varistor 26 and a first resistor 28 and a second resistor 30. The balancing network comprises a first 32 and a second 34 capacitor, a second varistor 36 and a third resistor 38. The first capacitor 32, the second varistor 36, and a series arrangement of the third resistor 38 with the second capacitor 34 are all connected in parallel to form the balancing network 24. The first inductor winding 12, the balancing network 24, the second inductor winding 14, and the third inductor winding 16 are serially connected to form a direct current series circuit across terminals $L_1$, $L_2$ of the telephone line. The junction of the second varistor 36 with the first 32 and second 34 capacitors being connected to one end 33 of the second inductor winding 14, and the junction of the second varistor 36 with the first capacitor 32 and third resistor 38 being connected to one end 39 of the first inductor winding 12.

One terminal 40 of the voice receiver unit 22 being connected via the fourth inductor winding 18 to the junction of the second capacitor 34 and the third resistor 38. One terminal 42 of the voice transmitter unit 20 being connected via a first resistor 28 to the junction of the second 14 and third 16 inductor windings. The second resistor 30 and the first varistor 26 form a series circuit connected across line terminals $L_1$ and $L_2$. A normally closed set of contacts 44 linked to the usual telephone hook switch (not shown) shunt the voice receiver unit 22 until the telephone user has released the hook switch by going "off-hook." The other end 48 of the voice receiver unit 22, the junction of the second varistor 36 and the first inductor winding 12, and the other end 50 of the voice transmitter unit 20 are connected to the signalling portion of the telephone substation circuit in a manner which will be described later. With regard to the previous circuit description of the speech circuit, the various elements described and their interconnections are generally well known in the art and may be typically seen and described in further detail in aforementioned U.S. Pat. No. Re25,507.

The signalling portion of the telephone substation circuit or subscriber telephone set includes a resonant circuit 52 coupled to an amplifier 54. As the structural make-up of the amplifier 54 and the resonant circuit 52 is well known and described in the art (e.g. aforementioned U.S. Pat. No. 3,284,577) only a minimal description is presented here.

The amplifier 54 includes a transistor 55, a capacitor 63, a pair of coils 90 and 92 in the emitter circuit of the transistor 55 and a further pair of coils 94 and 96 in the base circuit of the transistor 55. A fifth resistor 65, a diode 67, and a sixth resistor 69 establish the required operating bias voltages for the amplifier 54 when a suitable operating voltage is applied to the anode 71 of the diode 67.

The resonant circuit 52 includes a pair of tapped coils 56, 58 and a third and fourth capacitor 60, 62. Coils 56, 90 and 96 are closely coupled as are coils 58, 92 and 96 to transfer the oscillations generated in the resonant circuit 52 to the amplifier 54 in the well known manner. A selector switch (not shown) which is usually in the form of a number of digit buttons, is provided with a number of make contacts 57, 59 associated with the tapped coils 56, 58 of the resonant circuit 52 to connect the third and fourth 60, 62 capacitors to a selected portion of their corresponding coil to form two parallel resonant circuits in series in the well known manner. Linked to the selector switch are a number of other contact arrangements, particularly a transfer switch 64 having late-break contacts 66 and early-make contacts 68. In addition a early-break set of contacts 70 and a later-break set of contacts 72 are also linked to the selector switch.

The early-break contacts 70 are arranged so as to shunt a fourth resistor 74 which is in series with the voice receiver 22. This fourth resistor 74 is connected to said other end 48 of the voice receiver 22 and to the common terminal 76 of the transfer switch 64.

The late-break contacts 66 of the transfer switch 64 are connected to said other terminal 50 of the voice transmitter 20. One end 78 of the resonant circuit 52 is connected to the junction of the third inductor winding 16 and the first varistor 26 while the other end 80 of the resonant circuit is connected through later-break contacts 72 to the junction of coil 92 and diode 67 of amplifier 54. Early-make contacts 68 of the transfer switch 64, which are also connected to the junction of diode 67 and coil 92, serves to energize or enable amplifier 54 when the early-make contacts 68 are closed.

The amplifier 54 is connected through hook switch contacts 83 to the telephone line $L_1$ and via transfer switch 64, first inductor winding 12, and hook switch contacts 84 to the telephone line $L_2$.

In accordance with common practice a ringer 82 is connected across the telephone line $L_1$, $L_2$ and the aforementioned pair of make contacts 83, 84 of a hook switch (not shown) are used to disconnect the speech and multifrequency signalling circuits from the incoming lines $L_1$ and $L_2$. Incoming lines $L_1$ and $L_2$ which originate at the telephone central office 86 correspond to the "tip" and "ring" leads of standard telephone terminology.

OPERATION OF THE PREFERRED EMBODIMENT

After the phone is taken "off-hook," and prior to dialling (dialling here refers to a pushbutton or digit button form of multifrequency signalling), the hook switch make contacts 83, 84 close, and the normally closed contacts 44 of the hook switch, which shunt the voice receiver unit 22, open to render the voice receiver unit 22 operative. Before dialling, the contacts of the transfer switch 64 are in the positions shown in the drawing. Accordingly, a first direct current path is established from the central office 86 along $L_2$ through the first inductor winding 12, the balancing network 24, the second inductor winding 14, the third inductor winding 16, and back along $L_1$ to the central office 86. A second direct current path is established from the central office 86 along $L_2$ through the first inductor winding 12, the late-break contacts of transfer switch 64, the voice transmitter 20, the first resistor 28, the third inductor winding 16 and along $L_1$ back to the central office 86.

Additionally a further established direct current path includes the second resistor 30 and the first varistor 26.

Prior to dialling, the voice receiver unit 22 and the voice transmitter unit 20 are fully operative as the fourth resistor 74 is shunted by early-break contacts 70. No current passes through the resonant circuit 52 or the amplifier 54 at this time as the resonant circuit 52 and the amplifier 54, which are connected in parallel via later-break contacts 72, are not yet connected to a source of operating voltage. In the "off-hook" condition prior to dialling, therefore, this telephone set has an input impedance as seen from the telephone line $L_1$, $L_2$ which is substantially the same as that of a standard telephone set equipped with a rotary dial.

When multifrequency dialling is initiated by depressing one of the pushbuttons or digit buttons (not shown) of the selector switch, a pair of contacts 57, 59, one associated with each capacitor 60, 62 are initially closed in the well known manner to connect the third 60 and fourth 62 capacitors across a portion of their corresponding tapped coils 56, 58 which comprise the resonant circuit 52. Early-break contacts 70, which are mechanically linked to the digit buttons, next release to insert the fourth resistor 74 in series with the voice receiver unit 22 to attenuate the tone signals heard at the voice receiver unit to a comfortable user level. After a given time interval the transfer switch 64, which is also mechanically linked to the digit buttons, closes early-make contacts 68 to connect the amplifier 54 and the resonant circuit 52 to an operating voltage appearing at the junction of the first inductor winding 12 and second varistor 36. Shortly after the early-make contacts 68 have established contact as described above, the late-break contacts 66 of the transfer switch 64, separate to disconnect the transmitter 20 from the junction of the first inductor 12 and the second varistor 36.

After a predetermined interval, controlled by the design of the selector switch in which the amplifier 54 has become fully operational and the resonant circuit 52 has become sufficiently energized with the passage of direct current therethrough later-break contacts 72 separate to interrupt the flow of direct current through the resonant circuit 52. The later-break contacts 72, the early-break contacts 70, and the early-make and late-break contacts 68 and 66 of the selector switch 64, as well as the contacts 57, 59 associated with the resonant circuit 52 are mechanically linked to the digit buttons as shown by the dashed lines in the drawing.

Because the resonant circuit 52 and the amplifier 54 are connected in parallel via later-break contacts 72, they are simultaneously energized when early-make contacts 68 close. Subsequently, when later-break contacts 72 release to interrupt the flow of direct current through the resonant circuit 52 oscillations, which begin in the resonant circuit 52, are readily supported by the amplifier 54 to assure reliable multifrequency signalling to the central office 86.

After all the digits have been dialled the resonant circuit 52 and the amplifier 54 are reconnected in parallel and are effectively disconnected from the telephone line with the release of early-make contacts 68. With the reclosure of late-break contact 66 and early-make contacts 70 the speech circuit appears, as seen from telephone lines $L_1$ and $L_2$, and operates as a conventional subscriber set of the type provided with a rotary mechanical dial. The resonant circuit 52 and the amplifier 54 are therefore electrically invisible as seen from telephone lines $L_1$ and $L_2$ prior to, and subsequent to, dialling from a telephone set as described above.

What is claimed is:

1. A telephone signalling arrangement comprising:

a. a resonant circuit having a plurality of selectively controllable resonant frequencies;

b. selector means for selecting a resonant frequency of the resonant circuit;

c. amplifying means coupled to the resonant circuit for supporting oscillations at said selected frequency;

d. a first switch means responsive to said selector means, which upon closure concurrently connects the parallel combination of the resonant circuit and the amplifying means to a direct current operating voltage to enable the amplifying means and to energize the resonant circuit; and a second switch means which thereafter opens to initiate oscillations in the resonant circuit which are supported by the amplyifying means.

2. A telephone subscriber arrangement for signalling a central office comprising:

a. a resonant circuit including a capacitance means and an inductance means;

b. selector means for selectively connecting portions of the inductance means in parallel with the capacitance means to select a desired one of a plurality of resonant frequencies;

c. amplifying means coupled to said inductance means to support oscillations at said desired frequency; and d. switch means actuated by the operation of said selector means, to initially maintain the resonant circuit and the amplifying means in parallel, to subsequently connect the amplifying means and the resonant circuit to a direct current operating voltage in order to allow a direct current to simultaneously energize the amplifying means and the resonant circuit and lastly to interrupt the flow of direct current into the resonant circuit so as to initiate oscillations in the resonant circuit whereby sustained oscillations are begun at the selected frequency for transmission to the central office.

3. A telephone substation circuit of a central battery type having a pair of terminals and a speech circuit of the anti-sidetone type establishing a direct current path across said terminals, said speech circuit including a voice transmitter unit and a voice receiver unit, said substation circuit further comprising:

a. a multifrequency generator having a resonant circuit with discretely controllable resonant frequencies and an amplifying means;

b. selector means for selecting a discrete resonant frequency of the resonant circuit, the resonant circuit being coupled to the amplifying means in such a manner as to render the amplifying means capable of supporting oscillations at said selected frequency;

c. switch means, linked to said selector means, for maintaining the resonant circuit and the amplifying means in parallel prior to actuation and during the initial interval of actuation of said selector switch, for subsequently simultaneously enabling the amplifying means and the resonant circuit by connecting the amplifying means and the resonant circuit to the speech circuit so as to derive an operating voltage therefrom, and for finally interrupting the flow of direct current through the resonant circuit during the final interval of actuation of said selector switch;

whereby the selected resonant frequency is generated in the resonant circuit, supported by the amplifying means, and coupled to said pair of terminals.

4. A telephone substation circuit of the central battery type including a pair of terminals, an induction coil having a plurality of windings, a line impedance balancing network, a voice receiver unit and a voice transmitter unit, the voice transmitter unit being serially connected with a winding of the induction coil to form part of a series circuit establishing a direct current path across said terminals, said substation circuit further comprising:

a. a multifrequency generator having a resonant circuit with discretely controllable resonant frequencies, a selector means for selecting a discrete resonant frequency and an amplifying means, said resonant circuit being coupled to said amplifying means in such manner as to render said amplifying means capable of supporting oscillations at said selected frequency;

b. switch means connecting the resonant circuit and the amplifying means in parallel, said switch means responding to operation of said selector means by initially disconnecting the voice transmitter unit from said winding of the induction coil, by subsequently connecting the parallel combination of amplifying means and resonant circuit across the telephone line through said winding of the induction coil to initiate a flow of direct current through the resonant circuit and the amplifying means, and by finally interrupting the flow of direct current through the resonant circuit after said amplifying means has been enabled;

whereby the selected resonant frequency is generated and coupled to said pair of terminals.

5. The invention as claimed in claim 1 wherein the first and second switch means are mechanically linked to the selector means to be responsive thereto and wherein the first switch means comprises a set of early-make late-break transfer contacts and the second switch means comprises a set of later-break contacts, the later-break contacts serving to interrupt the flow of direct current through the resonant circuit so as to initiate oscillations at said selected frequency after the resonant circuit and the amplifying means have been enabled through the early-make contacts.

6. The invention as claimed in claim 3 wherein the switch means is mechanically linked to the selector means to be responsive thereto, and wherein the switch means comprises a set of early-make-late-break transfer contacts and a later-break set of contacts, the early-make contacts of said transfer contacts serving to simultaneously enable the amplifying means and the resonant circuit and the later-break contacts service to interrupt the flow of direct current through the resonant circuit so as to initiate oscillations at said selected frequency after the resonant circuit and the amplifying means have been enabled.

7. The invention as defined in claim 4 wherein the resonant circuit comprises an inductor with a plurality of tap positions and a capacitor connected to a selected one of said tap positions by the selector means, and wherein the switch means is mechanically linked to the selector means so as to operate with each operation of the selector means, the switch means having a set of early-make late-break transfer contacts and a later-break set of contacts whereby said transfer contacts, complete said series circuit in their unoperated position, and allow an operating voltage to enable the amplifying means and to energize the resonant circuit in their operated position, and whereby the later-break set of contacts interrupt the flow of direct current through the resonant circuit after said amplifying means has been enabled.

8. A circuit for a subscriber telephone set having a pair of terminals and a speech circuit of the anti-sidetone type connected across said terminals, said subscriber telephone circuit comprising:

a. an induction coil with a plurality of windings, a voice receiver unit, a voice transmitter unit, and a balancing network, first, second and third windings of an induction coil and the balancing network being serially connected to establish a first direct current path across said terminals, the balancing network being interposed between the first and second windings;

b. a second direct current path including the voice transmitter unit connecting the junction of the first winding of the induction coil and the balancing network to the junction of the second and third windings of the induction coil;

c. a multifrequency generator having a resonant circuit with discretely controllable resonant frequencies, a selector means including a multicontact selector switch for selecting a discrete resonant frequency and an amplifying means coupled to the resonant circuit in such manner as to support oscillations at said selected frequency;

d. switch means having a set of early-make-late-break transfer contacts and a set of later-break contacts, the switch means being linked to the selector switch to operate with each operation of the selector switch, the early-make transfer contacts initially closing to simultaneously enable the resonant circuit and the amplifying means by connecting the resonant circuit and the amplifying means to a voltage appearing at the junction of the first inductor winding and the balancing network, while the late-break transfer contacts, being in series with the second direct current path until operation of the selector switch, subsequently separate to interrupt the flow of direct current through the voice transmitter, and finally the later-break contacts open after the amplifying means has been enabled to interrupt the flow of direct current through the resonant circuit and initiate oscillations at said selected frequency;

e. means connecting the output of said multifrequency generator to said pair of terminals.

9. The invention as defined in claim 8 wherein the resonant circuit includes a capacitance means and an inductive means with a plurality of taps, and wherein the selector means includes a plurality of momentary contact switches arranged to connect the capacitance means across a portion of the inductive means via said taps.

* * * * *